(12) United States Patent
Chauvenet

(10) Patent No.: US 11,075,600 B2
(45) Date of Patent: Jul. 27, 2021

(54) METHOD FOR CONTROLLING A THREE-PHASE ELECTRICAL MACHINE

(71) Applicant: Valeo Siemens eAutomotive France SAS, Cergy (FR)

(72) Inventor: Pierre-Alexandre Chauvenet, Cergy (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 65 days.

(21) Appl. No.: 16/689,676

(22) Filed: Nov. 20, 2019

(65) Prior Publication Data

US 2020/0169210 A1    May 28, 2020

(30) Foreign Application Priority Data

Nov. 23, 2018 (FR) ...................... 1871793

(51) Int. Cl.
| | |
|---|---|
| *H02P 27/08* | (2006.01) |
| *H02P 21/22* | (2016.01) |
| *B60L 50/51* | (2019.01) |
| *B60K 6/26* | (2007.10) |

(52) U.S. Cl.
CPC ............ *H02P 27/085* (2013.01); *B60K 6/26* (2013.01); *B60L 50/51* (2019.02); *H02P 21/22* (2016.02)

(58) Field of Classification Search
CPC .............................. H02P 27/085; H02P 21/22
USPC ....................................... 318/400.02, 400.01
See application file for complete search history.

(56) References Cited

U.S. PATENT DOCUMENTS 8,044,631 B2 * 10/2011 Dai ................... H02M 7/53873
  318/800

OTHER PUBLICATIONS

Davood Yazdani et al: "Multifunctional Grid-Connected Multimodule Power Converters Capable of Operating in Single-Pulse and PWM Switching Modes", IEEE Transactions on Power Electronics, Institute of Electrical and Electronics Engineers, USA, vol. 23, No. 3, May 1, 2008 (May 1, 2008).
French Search Report for Application No. 1871793 dated Sep. 18, 2019.

* cited by examiner

*Primary Examiner* — David Luo
(74) *Attorney, Agent, or Firm* — McCormick, Paulding & Huber PLLC

(57) ABSTRACT

The purpose of the invention is a method for controlling a three-phase electrical machine from an inverter. Each sector of the complex representation of the space vector modulation being subdivided into three subsectors, comprising a central subsector centred on the active vector, a first lateral subsector associated with the first zero-sequence vector, and a second lateral subsector, opposite the first lateral subsector relative to the central subsector, associated with the second zero-sequence vector, it comprises a step of control of the voltage at the terminals of each phase of the electrical machine, measured relative to neutral, with the value defined by the control vector associated with the subsector in which the control vector is located.

20 Claims, 3 Drawing Sheets

[Fig. 1]
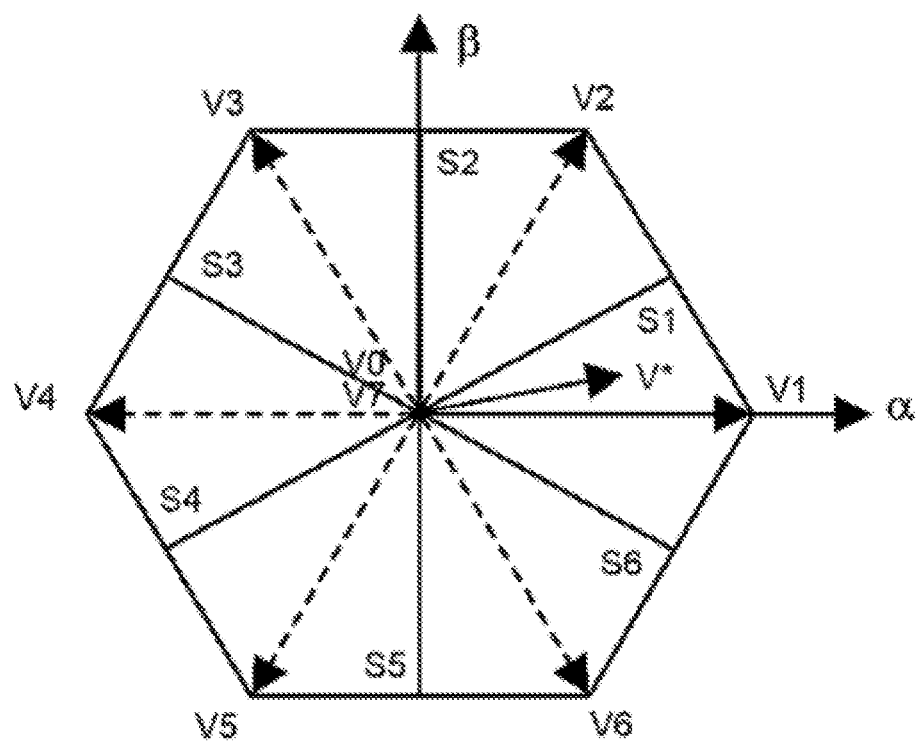
[Fig. 2]
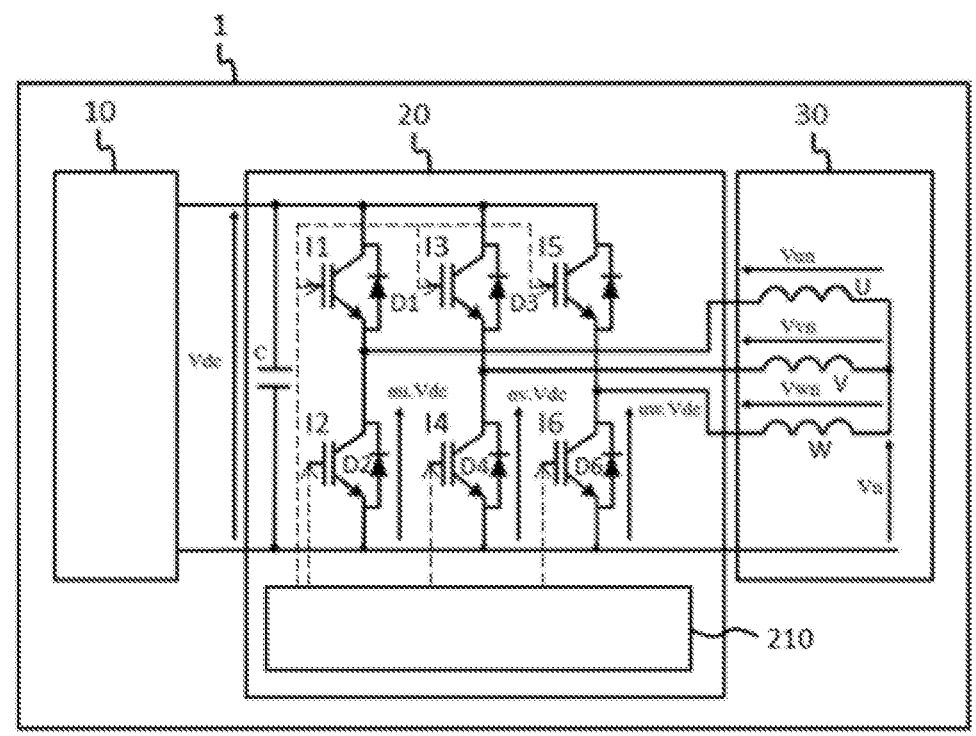

[Fig. 3]
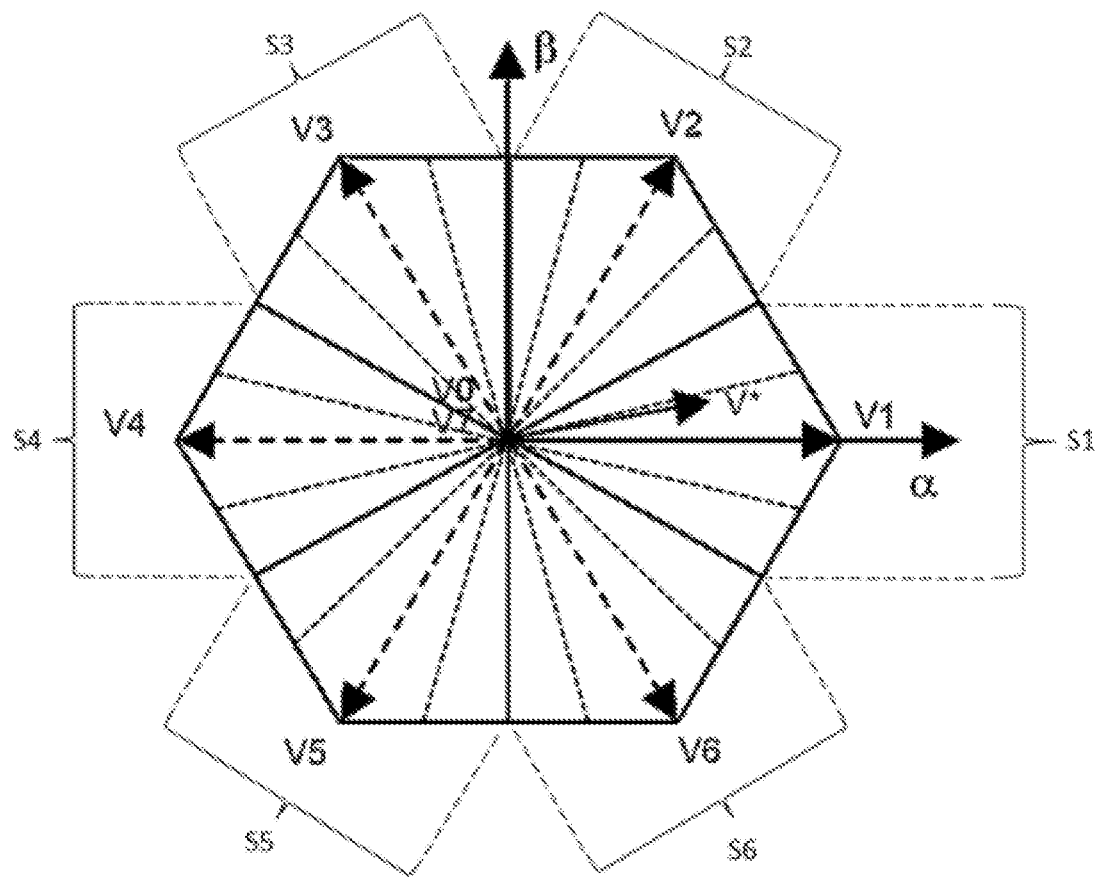
[Fig. 4]
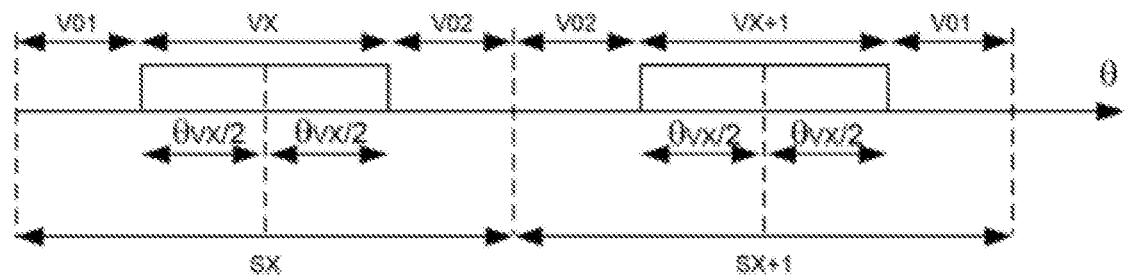

[Fig. 5A]
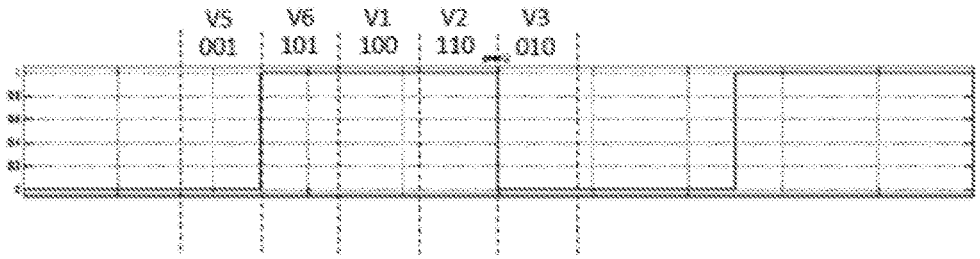
[Fig. 5B]
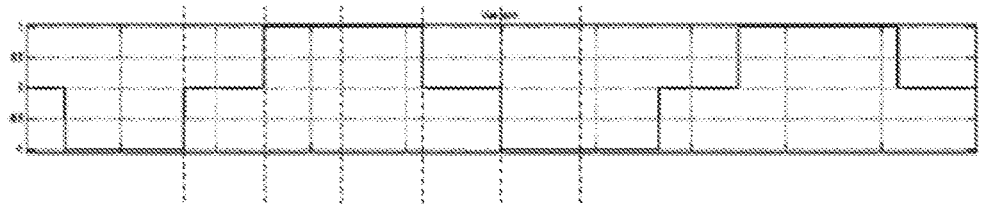
[Fig. 5C]
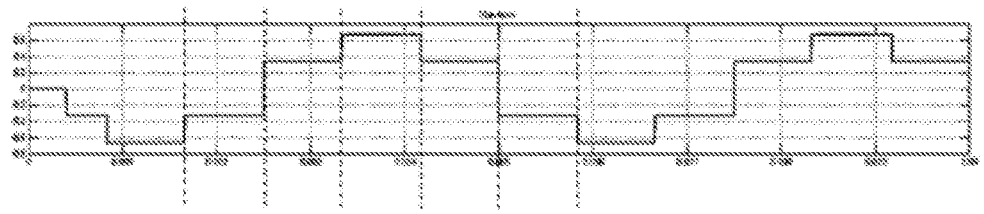
[Fig. 6A]
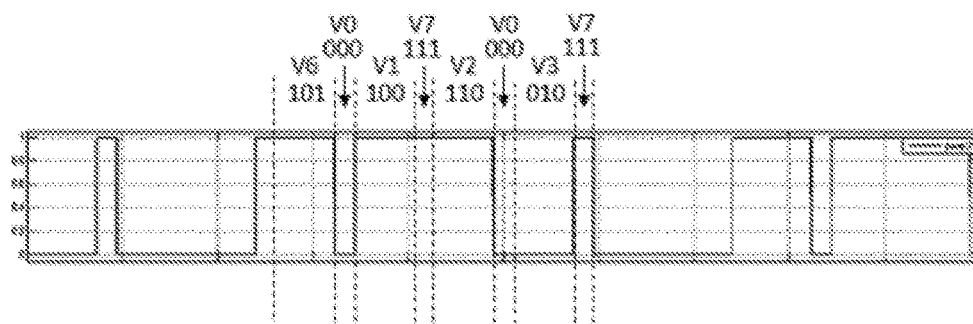
[Fig. 6B]
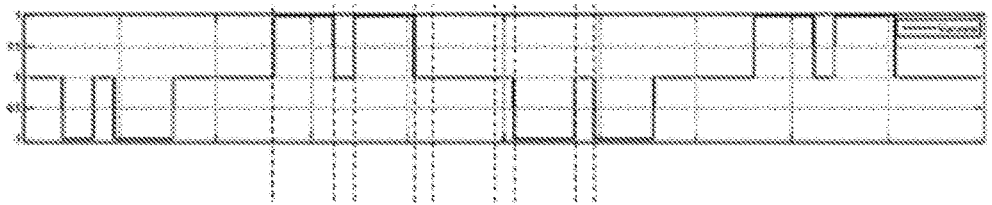
[Fig. 6C]
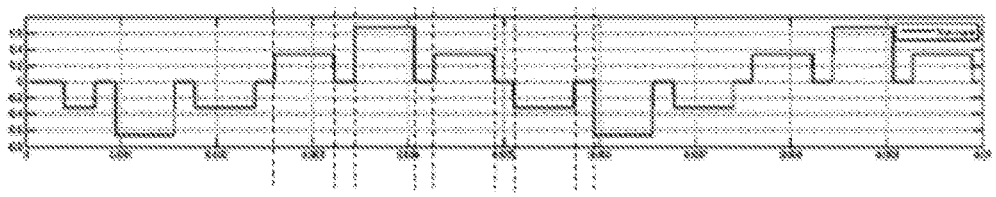

METHOD FOR CONTROLLING A THREE-PHASE ELECTRICAL MACHINE

CROSS-REFERENCE TO RELATED APPLICATION

This application claims foreign priority benefits under 35 U.S.C. § 119 to French Patent Application No. 1871793 filed on Nov. 23, 2018, the content of which is hereby incorporated by reference in its entirety.

TECHNICAL FIELD

The present invention concerns the control of three-phase electrical machines, and more specifically a system and method for controlling a three-phase electrical machine from an inverter, in particular for a motor vehicle.

The invention is configured, in particular, to provide an effective solution for control of an inverter by dynamic switching of its frequency, in particular enabling the rotational speed range of the rotor of the electrical machine to be extended.

BACKGROUND

As is known in the art, an electric or hybrid motor vehicle comprises an electric drivetrain, powered by a high-voltage power battery via a high-voltage on-board electrical network, and a plurality of auxiliary electrical devices, powered by a low-voltage power battery, via a low-voltage on-board electrical network. The high-voltage power battery implements the function of supplying the electric drivetrain with energy enabling the vehicle to be propelled. More specifically, in order to control the electrical machine driving the wheels of the vehicle, it is known in the art to use an inverter enabling the direct voltage supplied by the high-voltage power battery to be converted into one or more alternating control voltages, for example sinusoidal voltages.

In a manner known in the art, the inverter comprises electronic power components, through which the energy powering the electrical machine is transferred, and an electronic control unit, enabling said electronic power components to be controlled. These electronic power components include in particular the switches which are opened and closed by Pulse Width Modification, or PWM, signals generated by the electronic control unit.

In the case of a three-phase electrical machine the inverter generates, from the voltage delivered by the high-voltage battery, three voltages controlling the three phases of the electrical machine, phase-shifted pair-wise, for example by 120°. For this purpose, the inverter comprises three branches each of which has an upper switch and a lower switch, where the position of an upper switch of a branch is always the reverse of the position of the lower switch of this same branch. Since each upper switch of a branch can be in a position 0 or 1, there is a total of eight ($2^3$) possible combinations of configurations of the inverter's switches.

In its simplest strategy, switching of the switches is accomplished at a fixed frequency resulting from a comparison of a carrier and a modulator, usually sinusoidal "with third harmonic injection". Such a strategy, known as an "intersective MLI strategy" however has the significant disadvantages that it does not supply the maximum possible voltage to each phase of the electrical machine, that it leads to substantial losses by switching, and that it restricts the rotational speed range of the rotor of the electrical machine, since the frequency of the modulator is necessarily lower than the frequency of the carrier. It is therefore known in the art to use the digital equivalent of intersective MLI, which is known as Space Vector Modulation (SVM). In a manner known in the art, each configuration, which represents the simultaneous positions of the switches of the inverter, can be represented by a vector, called the "control vector", in a complex plane known as "αβ" by a person skilled in the art, which gives a two-dimensional representation of the eight vectors V0, V1, V2, V3, V4, V5, V6, V7. Vectors V1, V2, V3, V4, V5 and V6, referred to as the "active vectors", delimit six control sectors in the complex plane (hexagonal representation), where each sector is the portion extending between two adjacent vectors. Vector V0, which corresponds to the "0" positions of the three upper switches, is referred to as the "first zero-sequence vector", and vector V7, which corresponds to the "1" positions of the three upper switches, is referred to as the "second zero-sequence vector". The setpoint control of the electrical machine can be represented in this representation by a vector called the "reference vector", referred to below as the control vector, which moves from sector to sector with the rotation of the rotor of the electrical machine. The control vector is expressed as two components of the vectors of the sector in which it is located, and of one of the zero-sequence vectors. In other words, the control vector is expressed in the form of a combination of three vectors. It follows that for each sector generation of the phase voltages will be achieved by switching between three configurations of the switches, repeated at a fixed frequency. Although it can have advantages compared to intersective MLI, for example by altering the choice of sectors, the act of accomplishing a sequence with a fixed frequency has the same disadvantages as intersective MLI.

To remedy these disadvantages it is known in the art to use a "Full-Wave" SVM, also known as a "180°" or "Six Step" SVM. In a solution using the modulation type, each sector is centred on an active vector which is used to define the configuration of the switches when the control vector is in its sector. In other words, the control vector is expressed relative only to the active vector of the sector in which it is located. In this case the switching frequency is variable and depends on the rotational speed of the rotor of the electrical machine. It follows that the switching frequency of the switches, and therefore the losses caused by switching, are significantly reduced. Compared with a fixed-frequency switching strategy, such a strategy also enables a higher voltage to be delivered at each phase of the electrical machine, fewer losses to be generated by switching, and the rotational speed range of the electrical machine's rotor to be increased.

One disadvantage of this strategy is that the amplitude of the voltage applied to the phases of the electrical machine cannot be controlled, except by controlling the inverter's direct input voltage, which may prove excessively complex or costly to accomplish. But control of the amplitude of the voltage applied to the phases of the electrical machine is necessary to control the torque supplied by the electrical machine, over a broad range.

There is therefore a need for a simple, reliable and effective solution enabling these variations to be measured.

SUMMARY

To this end, one purpose of the invention is therefore a method for controlling a three-phase electrical machine from an inverter, where said inverter receives a direct voltage at its input, and delivers at its output three phase voltages enabling the electrical machine to be controlled, where the inverter comprises three branches each comprising an upper switch and a lower switch, where each switch can switch to an open or closed position, where the position of an upper switch of a branch is always the reverse of the position of the lower switch of this same branch, where the simultaneous positions of the switches of the branches of the inverter are represented by a control vector comprising three binary elements, i.e. eight vectors representing the various combinations of the possible positions of the switches, where the vector for which all the upper switches of the branches are in an open position is a first "zero-sequence" vector, and where the vector for which all the upper switches of the branches are in a closed position is a second "zero-sequence" vector, and the other vectors are called "active vectors", where said active vectors delimit six control sectors as a complex representation, in which at the centre of each sector there is an active vector, where the setpoint control of the electrical machine is represented by a control vector moving from sector to sector with the rotation of the electrical machine's rotor, where the method is characterised by the fact that, with each sector subdivided into three subsectors, comprising a central subsector centred on the active vector, a first lateral subsector associated with the first zero-sequence vector, and a second lateral subsector, opposite the first lateral subsector relative to the central subsector, associated with the second zero-sequence vector, it comprises a step of control of the voltage at the terminals of each phase of the electrical machine, measured relative to neutral, with the value defined by the control vector associated with the subsector in which the control vector is located.

In a first implementation the first lateral subsector precedes the central subsector, and the second lateral subsector succeeds the central subsector in each sector corresponding to the first, third and fifth control vectors.

In a second implementation the first lateral subsector precedes the central subsector, and the second lateral subsector succeeds the central subsector in each sector corresponding to the second, fourth and sixth control vectors.

According to one aspect of the invention, the angle of the angle sector corresponding to the central subsector of each sector is defined in radians by the following formula:

$$\theta_{VX} = \frac{|\overrightarrow{V_{\alpha\beta norm}}|}{\sqrt{\frac{3}{2}} \times \frac{2}{\pi}} \times \frac{\pi}{3} \qquad [\text{Math. 1}]$$

where [Math.2] $|\overrightarrow{V_{\alpha\beta norm}}|$ represents the norm of the normalised control vector (V*).

The angle of the angle sector corresponding to the central subsector of each sector is preferably between 0 and $$\frac{\pi}{3} \qquad [\text{Math. 3}]$$

radians.

According to one aspect of the invention, the method is a vector modulation of full-wave space.

The invention also concerns a control inverter of a three-phase electrical machine, where said inverter is able to convert a direct voltage into three phase voltages enabling the electrical machine to be controlled, where the inverter comprises three branches each comprising an upper switch and a lower switch, where each switch is able to switch to an open position or a closed position, where the position of an upper switch of a branch is always the reverse of the position of the lower switch of this same branch, where the simultaneous positions of the switches of the branches of the inverter are represented by a control vector comprising three binary elements, i.e. eight vectors representing the different combinations of the possible positions of the switches, where the vector for which all the upper switches of the branches are in an open position is a first zero-sequence vector, and where the vector for which all the upper switches of the branches are in a closed position is a second zero-sequence vector, and where the other vectors are called "active vectors", where said active vectors delimit six control sectors in a complex representation in which each sector comprises an active vector in its centre, where the setpoint control of the electrical machine is represented by a control vector moving from sector to sector with the rotation of the rotor of the electrical machine, where the inverter is characterised by the fact that, with each sector subdivided into three subsectors, comprising a central subsector centred on the active vector, a first lateral subsector associated with the first zero-sequence vector, and a second lateral subsector, opposite the first lateral subsector relative to the central subsector, associated with the second zero-sequence vector, it is configured to apply a voltage at the terminals of each phase of the electrical machine, measured relative to neutral, equal to the value defined by the control vector associated with the subsector in which the control vector is located.

In a first implementation the first lateral subsector precedes the central subsector, and the second lateral subsector succeeds the central subsector in each sector corresponding to the first, third and fifth control vectors.

In a second implementation the first lateral subsector precedes the central subsector, and the second lateral subsector succeeds the central subsector in each sector corresponding to the second, fourth and sixth control vectors.

According to one aspect of the invention, the angle of the angle sector corresponding to the central subsector of each sector is defined in radians by the following formula:

$$\theta_{VX} = \frac{|\overrightarrow{V_{\alpha\beta norm}}|}{\sqrt{\frac{3}{2}} \times \frac{2}{\pi}} \times \frac{\pi}{3} \qquad [\text{Math. 4}]$$

where [Math.5] $|\overrightarrow{V_{\alpha\beta norm}}|$ represents the norm of the normalised control vector (V*).

The angle of the angle sector corresponding to the central subsector of each sector is preferably between 0 and $$\frac{\pi}{3} \qquad [\text{Math. 6}]$$

radians.

The invention also concerns an electric drivetrain for a motor vehicle, where said drivetrain comprises a three-phase electric motor and an inverter, as presented beforehand, able to generate phase voltages of said electrical machine from a direct voltage.

According to one characteristic of the invention the drivetrain comprises a high-voltage power battery connected to the inverter via an interface defining a direct voltage.

The invention also concerns an electric or hybrid vehicle comprising an electric drivetrain as presented above.

BRIEF DESCRIPTION OF THE DRAWINGS

The invention will be better understood on reading the following description, given only as an example, which makes reference to the appended drawings, given as non-restrictive examples, in which identical references are given to similar objects, and in which:

FIG. 1 (previously commented) illustrates a representation of the control vectors and of the sectors in the space vector modulation of the prior art;

FIG. 2 illustrates schematically an implementation of an inverter according to the invention;

FIG. 3 illustrates a representation of the control vectors and of the sectors in the space vector modulation according to the invention;

FIG. 4 illustrates schematically a detailed linear representation of two adjacent sectors and of their subsectors;

FIG. 5A is an example of a signal applied to the terminals of lower switch I2 of the first branch of the inverter of FIG. 2 with a strategy of the Full-Wave type of the prior art;

FIG. 5B is an example of a normalised differential voltage signal between phase U and phase V during control of the switches comprising control of lower switch I2 of the first branch of the inverter of FIG. 2 by the signal of FIG. 5A with a strategy of the Full-Wave type of the prior art;

FIG. 5C is an example of a voltage signal at the terminals of phase U during control of the switches comprising control of lower switch I2 of the first branch of the inverter of FIG. 2 by the signal of FIG. 5A with a strategy of the Full-Wave type of the prior art;

FIG. 6A is an example of a signal applied to the terminals of lower switch I2 of the first branch of the inverter of FIG. 2 with the strategy according to the invention;

FIG. 6B is an example of a normalised differential voltage signal between phase U and phase V when during control of the switches comprising control of lower switch I2 of the first branch of the inverter of FIG. 2 by the signal of FIG. 6A with the strategy according to the invention;

FIG. 6C is an example of a voltage signal at the terminals of phase U during control of the switches comprising control of lower switch I2 of the first branch of the inverter of FIG. 2 by the signal of FIG. 6A with the strategy according to the invention.

It should be noted that the figures explain the invention in detail in order to implement the invention, and that said figures can of course be used to improve the definition of the invention, if applicable.

DETAILED DESCRIPTION

In the description which will be given below the invention will be described in its application to an electric or hybrid motor vehicle, although this is not restrictive of the scope of the present invention.

In FIG. 2 an example of an electrical diagram of an electric drivetrain for a motor vehicle has been represented. This electric drivetrain comprises a high-voltage power battery 10, an inverter 20 and an electrical machine 30.

High-voltage power battery 10 is connected to inverter 20 to implement a function of supply energy to electrical machine 30, to cause its rotor to rotate, or a function of collection of energy supplied from the electrical machine, for example during braking of the vehicle. High-voltage power battery 10 typically delivers a voltage of between 100 V and 900 V, and preferably of between 100 V and 500 V. Recharging of high-voltage power battery 10 with electrical energy can also be accomplished by connecting it to an external electrical power network, for example the domestic AC electrical network.

Electrical machine 30 is a rotating electrical machine, preferably configured to drive the wheels of the vehicle from the energy supplied by high-voltage power battery 10. More specifically, electrical machine 30 is an alternating current electrical machine powered by a source of polyphase currents. For example, electrical machine 30 can be an alternating current motor. In the preferred example described below, electrical machine 30 is powered by a source of three-phase currents, although this is not restrictive of the scope of the present invention.

In this example electrical machine 30 is controlled by means of the inverter. For this purpose, inverter 20 is configured to convert the direct current provided by high-voltage power battery 10 into three alternating control currents, for example sinusoidal currents. In other words, the function of inverter 20 is to transform the direct current delivered at the input by high-voltage power battery 10 into three phase currents enabling electrical machine 30 to be controlled. Conversely, in another operating mode, electrical machine 30 can also supply three alternating currents to inverter 20 in order that said inverter 20 transforms them into a direct current enabling high-voltage power battery 10 to be charged.

Inverter 20 comprises an electronic control unit 210 and electronic power components through which the energy supplying the electrical machine is transferred.

These components enable the direct voltage supplied by high-voltage power battery 10 to be transformed into alternating phase voltages to for powering electrical machine 30. These components include in particular electronic switches I1, I2, I3, I4, I5, I6, which take the form, for example, of semiconductor transistors, arranged in an electrical circuit to allow a controlled transfer of electrical energy from and to electrical machine 30.

Electronic control unit 210 is able to control switches I1, I2, I3, I4, I5, I6, in order in particular that said switches I1, I2, I3, I4, I5, I6 accomplish the function of conversion of the direct voltage received from high-voltage power battery 10 into three alternating control voltages of phases U, V, W of electrical machine 30.

Inverter 20 comprises three branches, each comprising an upper switch I1, I3, I5 and a lower switch I2, I4, I6. Each switch I1, I2, I3, I4, I5, I6 is able to switch to an open position or a closed position, where the position of an upper switch I1, I3, I5 of a branch is always the reverse of the position of lower switch I2, I4, I6 of this same branch.

The simultaneous positions of switches I1, I2, I3, I4, I5, I6 of the branches of inverter 20 are represented by a control vector comprising three binary elements, i.e. eight vectors V0, V1, V2, V3, V4, V5, V6, V7, representing the different combinations of the possible positions of switches I1, I2, I3, I4, I5, I6. In other words, each control vector V0, V1, V2, V3, V4, V5, V6, V7 corresponds to a state of all positions of switches I1, I2, I3, I4, I5, I6. Vectors V1, V2, V3, V4, V5 and V6 are called "active vectors", since the voltage at the terminals of at least one phase of electrical machine 30 is non-zero when the configurations of switches I1, I2, I3, I4, I5, I6 associated with these vectors are used.

Active vectors V1, V2, V3, V4, V5 and V6 delimit six control sectors S1, S2, S3, S4, S5, S6 in a complex representation, in which at the centre of each sector S1, S2, S3, S4, S5, S6 is an active vector, where vector V0 is called "the first zero-sequence vector", and vector V7 is called the "second zero-sequence vector".

Electronic control unit 210 is configured to receive (or to generate) a setpoint enabling electrical machine 30 to be controlled, and to determine a control vector V*, also called the reference vector in the literature, which is representative of the received setpoint. This control vector V* moves from sector S1, S2, S3, S4, S5, S6 to sector S1, S2, S3, S4, S5, S6 in an anticlockwise direction, with the rotation of the rotor of electrical machine 30, in a manner known in the art.

Electronic control unit 210 is configured to determine in which subsector control vector V* is located at a given moment, and to apply a voltage to the terminals of each phase U, V, W of electrical machine 30, measured relative to neutral, equal to the value defined by control vector V0, V1, V2, V3, V4, V5, V6, V7 associated with the subsector in which control vector V* is located.

To this end, electronic control unit 210 is configured to control switches I1, I2, I3, I4, I5, I6 so as to put them in the configuration corresponding to control vector V0, V1, V2, V3, V4, V5, V6, V7, associated with the subsector where control vector V* is located. Such control is accomplished by the generation and transmission, by electronic control unit 210, of PWM (Pulse Width Modulation) signals to switches I1, I2, I3, I4, I5, I6. Since the generation of such PWM is known in the art it will not be described in greater detail here.

FIG. 3 illustrates a representation of control vectors V0, V1, V2, V3, V4, V5, V6, V7, of sectors S1, S2, S3, S4, S5, S6 and of the subsectors in the space vector modulation according to the invention. If it is supposed that phases U, V, W of electrical machine 30 are balanced, this gives $$v_{UN} + v_{VN} + v_{WN} = 0 \qquad [\text{Math.7}]$$

where [Math.8] $v_{UN}$, [Math.9] $v_{VN}$ and [Math.10] $v_{WN}$ represent the voltages at the terminals of each phase U, V, W of electrical machine 30.

The voltage [Math.11] $v_N$ at the central point of phases U, V, W of $$v_N = \frac{(\alpha_U + \alpha_V + \alpha_W) \times V_{dc}}{3} \qquad [\text{Math. 12}]$$

electrical machine 30 is defined by where [Math.13] $\alpha_U$, $\alpha_V$, $\alpha_W$ represent the coefficient giving the voltages at the terminals of lower switches I2, I4, I6 of the three branches of inverter 1 when said coefficient is multiplied by the direct input voltage [Math.14] $V_{dc}$ of inverter 1.

The normalised voltage [Math.15] $v_{Nnorm}$ of the voltage [Math.16] $v_N$ is therefore written $$v_{Nnorm} = \frac{v_N}{V_{DC}} = \frac{(\alpha_U + \alpha_V + \alpha_W)}{3} \qquad [\text{Math. 17}]$$

Similarly, the normalised voltage at the terminals of each phase U, V, W of electrical machine 30 is written $$v_{UNnorm} = \frac{v_{UN}}{V_{DC}}, \qquad [\text{Math. 18}]$$

$$v_{VNnorm} = \frac{v_{VN}}{V_{DC}} \text{ and} \qquad [\text{Math. 19}]$$

$$v_{WNnorm} = \frac{v_{WN}}{V_{DC}} \qquad [\text{Math. 20}]$$

It can then be deduced therefrom:

$$v_{UNnorm} = \qquad [\text{Math. 21}]$$
$$\alpha_U - v_{Nnorm} = \alpha_U - \frac{(\alpha_U + \alpha_V + \alpha_W)}{3} = \frac{2 \times \alpha_U - \alpha_V - \alpha_W}{3}$$

$$v_{VNnorm} = \qquad [\text{Math. 22}]$$
$$\alpha_V - v_{Nnorm} = \alpha_V - \frac{(\alpha_U + \alpha_V + \alpha_W)}{3} = \frac{-\alpha_U + 2 \times \alpha_V - \alpha_W}{3}$$

$$v_{VNnorm} = \qquad [\text{Math. 23}]$$
$$\alpha_W - v_{Nnorm} = \alpha_W - \frac{(\alpha_U + \alpha_V + \alpha_W)}{3} = \frac{-\alpha_U - \alpha_V + 2 \times \alpha_W}{3}$$

I.e. in complex plane αβ control vector V*, which is normalised, is noted $$\vec{V_{\alpha\beta norm}} = \qquad [\text{Math. 24}]$$

$$\begin{pmatrix} v_{\alpha norm} \\ v_{\beta norm} \end{pmatrix} = \sqrt{\frac{2}{3}} \begin{pmatrix} \cos(0) & \cos\left(\frac{2\pi}{3}\right) & \cos\left(\frac{4\pi}{3}\right) \\ \sin(0) & \sin\left(\frac{2\pi}{3}\right) & \sin\left(\frac{4\pi}{3}\right) \end{pmatrix} \cdot \begin{pmatrix} v_{UNnorm} \\ v_{VNnorm} \\ v_{WNnorm} \end{pmatrix}.$$

In this case the Concordia transform has been chosen for the example, but the reasoning is also valid for the Clarke transform.

The values of these various parameters can be summarised in table 1 below for each of control vectors V0, V1, V2, V3, V4, V5, V6, V7:

TABLE 1

|    | αU | αV | αW | Vun norm |      | Vvn norm |      | Vwn norm |      | Vα norm |           | Vβ norm |           |
|----|----|----|----|----------|------|----------|------|----------|------|---------|-----------|---------|-----------|
| V0 | 0  | 0  | 0  | 0.0000   | 0    | 0.0000   | 0    | 0.0000   | 0    | 0.0000  | 0         | 0.0000  | 0         |
| V1 | 1  | 0  | 0  | 0.6667   | 2/3  | −0.3333  | −1/3 | −0.3333  | −1/3 | 0.8165  | sqrt(2/3) | 0.0000  | 0         |
| V2 | 1  | 1  | 0  | 0.3333   | 1/3  | 0.3333   | 1/3  | −0.6667  | −2/3 | 0.4082  | 1/sqrt(6) | 0.7071  | sqrt(2)/2 |
| V3 | 0  | 1  | 0  | −0.3333  | −1/3 | 0.6667   | 2/3  | −0.3333  | −1/3 | −0.4082 | −1/sqrt(6)| 0.7071  | sqrt(2)/2 |
| V4 | 0  | 1  | 1  | −0.6667  | −2/3 | 0.3333   | 1/3  | 0.3333   | 1/3  | −0.8165 | −sqrt(2/3)| 0.0000  | 0         |
| V5 | 0  | 0  | 1  | −0.3333  | −1/3 | −0.3333  | −1/3 | 0.6667   | 2/3  | −0.4082 | −1/sqrt(6)| −0.7071 | −sqrt(2)/2|
| V6 | 1  | 0  | 1  | 0.3333   | 1/3  | −0.6667  | −2/3 | 0.3333   | 1/3  | 0.4082  | 1/sqrt(6) | −0.7071 | −sqrt(2)/2|
| V7 | 1  | 1  | 1  | 0.0000   | 0    | 0.0000   | 0    | 0.0000   | 0    | 0.0000  | 0         | 0.0000  | 0         |

Each sector S1, S2, S3, S4, S5, S6 is itself subdivided into three subsectors: a central subsector centred on active vector V1, V2, V3, V4, V5, V6 of the sector, associated with said active vector V1, V2, V3, V4, V5, V6, a first lateral subsector, associated with first zero-sequence vector V0, and a second lateral subsector, opposite the first lateral subsector relative to the central subsector, associated with second zero-sequence vector V7.

tion, and preferably, two adjacent, lateral subsectors, but which belong to two different sectors, are associated with the same zero-sequence sector (either first zero-sequence vector V0, or second zero-sequence vector V7).

The two possible sequences VMFW1, VMFW2 of association of the control vectors have been represented in Table 2 below, compared with the sequence used with the Full-Wave (FW) strategy:

TABLE 2

| | S1 | | | S2 | | | S3 | | | S4 | | | S5 | | | S6 | | |
|---|---|---|---|---|---|---|---|---|---|---|---|---|---|---|---|---|---|---|
| FW | V1 | V1 | V1 | V2 | V2 | V2 | V3 | V3 | V3 | V4 | V4 | V4 | V5 | V5 | V5 | V6 | V6 | V6 |
| VMFW1 | V0 | V1 | V7 | V7 | V2 | V0 | V0 | V3 | V7 | V7 | V4 | V0 | V0 | V5 | V7 | V7 | V6 | V0 |
| VMFW2 | V7 | V1 | V0 | V0 | V2 | V7 | V7 | V3 | V0 | V0 | V4 | V7 | V7 | V5 | V0 | V0 | V6 | V7 |

FIG. 4 illustrates a detailed example of subdivision of two adjacent sectors SX, SX+1, centred respectively on a control vector VX (X=1, 2, 3, 4 or 5) and a control vector VX+1. Each sector S1, S2, S3, S4, S5, S6 is subdivided into three subsectors. The central subsector is centred on control vector VX, VX+1 over an angle [Math.25] $\theta_{VX}$ defined in radians using the following formula

[Math. 26]
$$\theta_{VX} = \frac{|\overrightarrow{V_{\alpha\beta norm}}|}{|\overrightarrow{V_{\alpha\beta norm}}|_{max}} \times \frac{\pi}{3}.$$

In the knowledge that with a full-wave control it is known in the art that:

[Math. 27]
$$|\overrightarrow{V_{\alpha\beta}}|_{max} = \sqrt{\frac{3}{2}} \times \frac{2}{\pi} \times V_{DC} \text{ i.e.}$$

[Math. 28]
$$|\overrightarrow{V_{\alpha\beta norm}}|_{max} = \sqrt{\frac{3}{2}} \times \frac{2}{\pi}$$

where [Math.29] $|\overrightarrow{V_{\alpha\beta norm}}|$ represents the norm of the normalised control vector and therefore:

[Math. 30]
$$\theta_{VX} = \frac{|\overrightarrow{V_{\alpha\beta norm}}|}{\sqrt{\frac{3}{2}} \times \frac{2}{\pi}} \times \frac{\pi}{3}$$

According to the invention the only case is the one in which

[Math. 31]
$$\theta_{VX} < \frac{\pi}{3}, \text{ i.e.}$$

[Math. 32]
$$\frac{|\overrightarrow{V_{\alpha\beta norm}}|}{\sqrt{\frac{3}{2}} \times \frac{2}{\pi}} < 1.$$

The lateral subsectors are of identical angle and frame the central subsector. One of the subsectors is associated with first zero-sequence vector V0, while the other subsector is associated with second zero-sequence vector V7. In addi- It is thus observed that control vector V* is associated in succession with a zero-sequence vector V0 or V7 and subsequently with active vector V1, V2, V3, V4, V5, V6 of sector S1, S2, S3, S4, S5, S6 in which it is located, and subsequently with other zero-sequence vector V7 or V0, and so forth, which enables the positive and zero voltages at the terminals of phases U, V, W of electrical machine 30 to be alternated. Such an alternance of voltage at the terminals of phases U, V, W of electrical machine 30 enables the RMS voltage amplitude at the terminals of the phases of the electrical machine to be made to vary, independently of the value of the battery voltage, which does not allow a Full-Wave strategy.

When drivetrain 1 is operating, electronic control unit 210 controls switches I1, I2, I3, I4, I5, I6 according to one or other of sequences VMFW1 or VMFW2, such that the voltage at the terminals of each phase U, V, W of electrical machine 30, measured relative to neutral, is equal to the value (given in Table 1) defined by control vector V0, V1, V2, V3, V4, V5, V6, V7 associated with the subsector in which control vector V* is located.

In FIGS. 5A to 5C an example of a control of phase U of the electrical machine has been represented for which the values taken by control vector V* are equal to the successive values of active vectors V1, V2, V3, V4, V5, V6, according to the Full-Wave strategy. It is observed that the values of the normalised voltage signal at the terminals of phase U are equal in succession to the values of active vectors V1, V2, V3, V4, V5, V6 (FIG. 5C) and enable an alternation of 0 and 1 in lower switch I2 of the first branch of inverter 20 at one third of the frequency of said normalised voltage signal at the terminals of phase U.

In FIGS. 6A to 6C an example of a control of phase U of the electrical machine has been represented for which the values taken by control vector V* are equal to the successive values of the VMFW1 or VMFW2 sequence defined according to the invention. It is observed that the switching frequency of switches I1, I2, I3, I4, I5, I6 is three times higher than with a Full-Wave strategy. The order of travel of the active vectors is the same as with a Full-Wave strategy, but it is alternated with one or other of zero-sequence vectors V0, V7, the effect of which is that the amplitude of the RMS voltage applied at the terminals of each phase U, V, W of electrical machine 30 can be controlled.

Although it increases the switching frequency, and therefore the losses by switching, compared to the Full-Wave strategy, the strategy according to the invention enables the advantages of the fixed-frequency strategy and of the Full-Wave strategy to be combined, i.e. an extended rotor speed range, and an available voltage at the terminals of each phase U, V, W of electrical machine 30 which is variable, and the maximum value of which is higher than with a fixed-frequency switching strategy. It can, for example, replace the fixed-frequency strategy and/or the Full-Wave strategy, or simply provide a transition between the two strategies.

What is claimed is:

1. A method for controlling a three-phase electrical machine from an inverter, where said inverter receives a direct voltage at its input, and delivers at its output three phase voltages enabling the electrical machine to be controlled, where the inverter comprises three branches each comprising an upper switch and a lower switch, where each switch can switch to an open or closed position, where the position of an upper switch of a branch is always the reverse of the position of the lower switch of this same branch, where the simultaneous positions of the switches of the branches of the inverter are represented by a control vector comprising three binary elements, i.e. eight vectors representing the various combinations of the possible positions of the switches, where the vector for which all the upper switches of the branches are in an open position is a first "zero-sequence" vector, and where the vector for which all the upper switches of the branches are in a closed position is a second "zero-sequence" vector, and the other vectors are called "active vectors", where said active vectors delimit six control sectors as a complex representation, in which at the centre of each sector there is an active vector, where the setpoint control of the electrical machine is represented by a control vector moving from sector to sector with the rotation of the electrical machine's rotor, wherein, with each sector subdivided into three subsectors, comprising a central subsector centred on the active vector, a first lateral subsector associated with the first zero-sequence vector, and a second lateral subsector, opposite the first lateral subsector relative to the central subsector, associated with the second zero-sequence vector, it comprises a step of control of the voltage at the terminals of each phase of the electrical machine, measured relative to neutral, with the value defined by the control vector associated with the subsector in which the control vector is located.

2. The method according to claim 1, in which the first lateral subsector precedes the central subsector, and the second lateral subsector succeeds the central subsector in each sector corresponding to the first, third and fifth control vectors.

3. The method according to claim 2, in which the angle ($\theta_{VX}$) of the angle sector corresponding to the central subsector of each sector is between 0 and $$\frac{\pi}{3}$$

radians.

4. The method according to claim 2, in which the angle ($\theta_{VX}$) of the angle sector corresponding to the central subsector of each sector is defined in radians using the following formula:

$$\theta_{VX} = \frac{|\overrightarrow{V_{\alpha\beta\,norm}}|}{\sqrt{\frac{3}{2} \times \frac{2}{\pi}}} \times \frac{\pi}{3}.$$

5. The method according to claim 2, where said method is a full-wave space vector modulation.

6. The method according to claim 1, in which the first lateral subsector precedes the central subsector, and the second lateral subsector succeeds the central subsector in each sector corresponding to the second, fourth and sixth control vectors.

7. The method according to claim 6, in which the angle ($\theta_{VX}$) of the angle sector corresponding to the central subsector of each sector is between 0 and $$\frac{\pi}{3}$$

radians.

8. The method according to claim 6, in which the angle ($\theta_{VX}$) of the angle sector corresponding to the central subsector of each sector is defined in radians using the following formula:

$$\theta_{VX} = \frac{|\overrightarrow{V_{\alpha\beta\,norm}}|}{\sqrt{\frac{3}{2} \times \frac{2}{\pi}}} \times \frac{\pi}{3}.$$

9. The method according to claim 6, where said method is a full-wave space vector modulation.

10. The method according to claim 1, in which the angle ($\theta_{VX}$) of the angle sector corresponding to the central subsector of each sector is between 0 and $$\frac{\pi}{3}$$

radians.

11. The method according to claim 10, in which the angle ($\theta_{VX}$) of the angle sector corresponding to the central subsector of each sector is defined in radians using the following formula:

$$\theta_{VX} = \frac{|\overrightarrow{V_{\alpha\beta\,norm}}|}{\sqrt{\frac{3}{2} \times \frac{2}{\pi}}} \times \frac{\pi}{3}.$$

12. The method according to claim 1, in which the angle ($\theta_{VX}$) of the angle sector corresponding to the central subsector of each sector is defined in radians using the following formula:

$$\theta_{VX} = \frac{|\overrightarrow{V_{\alpha\beta\,norm}}|}{\sqrt{\frac{3}{2} \times \frac{2}{\pi}}} \times \frac{\pi}{3}$$

where $|\overrightarrow{V_{\alpha\beta norm}}|$ represents the norm of the normalised control vector.

13. The method according to claim 1, where said method is a full-wave space vector modulation.

14. An inverter for controlling a three-phase electrical machine, where said inverter is able to convert a direct voltage into three phase voltages enabling the electrical machine to be controlled, where the inverter comprises three branches each comprising an upper switch and a lower switch, where each switch can switch to an open or closed position, where the position of an upper switch of a branch is always the reverse of the position of the lower switch of this same branch, where the simultaneous positions of the switches of the branches of the inverter are represented by a control vector comprising three binary elements, i.e. eight vectors representing the various combinations of the possible positions of the switches, where the vector for which all the upper switches of the branches are in an open position is a first "zero-sequence" vector, and where the vector for which all the upper switches of the branches are in a closed position is a second "zero-sequence" vector, and the other vectors are called "active vectors", where said active vectors delimit six control sectors as a complex representation, in which at the centre of each sector there is an active vector, where the setpoint control of the electrical machine is represented by a control vector moving from sector to sector with the rotation of the electrical rotor of the electrical machine, wherein, with each sector subdivided into three subsectors, comprising a central subsector centred on the active vector, a first lateral subsector associated with the first zero-sequence vector, and a second lateral subsector, opposite the first lateral subsector relative to the central subsector, associated with the second zero-sequence vector, it is configured to apply a voltage at the terminals of each phase of the electrical machine, measured relative to neutral, equal to the value defined by the control vector associated with the subsector in which the control vector is located.

15. The inverter according to claim 14, in which the first lateral subsector precedes the central subsector, and the second lateral subsector succeeds the central subsector in each sector corresponding to the first, third and fifth control vectors.

16. The inverter according to claim 14, in which the first lateral subsector precedes the central subsector, and the second lateral subsector succeeds the central subsector in each sector corresponding to the second, fourth and sixth control vectors.

17. The inverter according to claim 14, in which the angle ($\theta_{VX}$) of the angle sector corresponding to the central subsector of each sector is between 0 and $$\frac{\pi}{3}$$

radians.

18. The inverter according to claim 14, in which the angle ($\theta_{VX}$) of the angle sector corresponding to the central subsector of each sector is defined in radians using the following formula:

$$\theta_{VX} = \frac{|\overrightarrow{V_{\alpha\beta\,norm}}|}{\sqrt{\frac{3}{2} \times \frac{2}{\pi}}} \times \frac{\pi}{3}$$

where $|\overrightarrow{V_{\alpha\beta norm}}|$ represents the norm of the normalised control vector.

19. An electric drivetrain for a motor vehicle, where said drivetrain comprises a three-phase electrical machine and an inverter, according to claim 7, able to generate phase voltages of said electrical machine from a direct voltage.

20. The drivetrain according to claim 19, comprising a high-voltage power battery connected to the inverter via an interface defining a direct voltage.

* * * * *

UNITED STATES PATENT AND TRADEMARK OFFICE
CERTIFICATE OF CORRECTION

PATENT NO. : 11,075,600 B2
APPLICATION NO. : 16/689676
DATED : July 27, 2021
INVENTOR(S) : Pierre-Alexandre Chauvenet It is certified that error appears in the above-identified patent and that said Letters Patent is hereby corrected as shown below:

In the Claims

Column 11, Claim 3, Line 49, after "between" please delete "U" and insert -- 0 --.

Signed and Sealed this
Thirty-first Day of January, 2023

Katherine Kelly Vidal
*Director of the United States Patent and Trademark Office*